United States Patent
Zhao et al.

(10) Patent No.: US 9,774,464 B2
(45) Date of Patent: Sep. 26, 2017

(54) MULTICAST PACKET TRANSMISSION METHOD, AND APPARATUS

(71) Applicant: Huawei Technologies Co., Ltd., Shenzhen (CN)

(72) Inventors: Mu Zhao, Beijing (CN); Xun Yang, Beijing (CN); Yanping Jiang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 379 days.

(21) Appl. No.: 14/462,816

(22) Filed: Aug. 19, 2014

(65) Prior Publication Data
US 2014/0355509 A1 Dec. 4, 2014

Related U.S. Application Data

(63) Continuation of application No. PCT/CN2013/088786, filed on Dec. 6, 2013.

(30) Foreign Application Priority Data

Mar. 6, 2013 (CN) .......................... 2013 1 0071466
Mar. 6, 2013 (CN) .......................... 2013 1 0144338

(51) Int. Cl.
*H04W 4/00* (2009.01)
*H04L 12/18* (2006.01)
(Continued)

(52) U.S. Cl.
CPC ............ *H04L 12/189* (2013.01); *H04L 12/18* (2013.01); *H04L 61/2069* (2013.01); *H04W 4/06* (2013.01);
(Continued)

(58) Field of Classification Search
CPC . H04L 12/189; H04L 5/0053; H04L 61/2069; H04W 28/106; H04W 8/26; H04W 4/06; H04W 28/06
See application file for complete search history.

(56) References Cited

U.S. PATENT DOCUMENTS 8,971,213 B1 * 3/2015 Hart ........................ H04W 8/26
370/255
2007/0058566 A1 3/2007 Frederiks et al.
(Continued)

FOREIGN PATENT DOCUMENTS

CN 1601997 A 3/2005
CN 101268660 A 9/2008
(Continued)

OTHER PUBLICATIONS

Partial English Translation and Abstract of Chinese Patent Application No. CN1601997A, Nov. 13, 2014, 4 pages.
(Continued)

*Primary Examiner* — Kevin C Harper
(74) *Attorney, Agent, or Firm* — Conley Rose, P.C.

(57) ABSTRACT

A multicast packet transmission method and an apparatus are provided that relate to the communications field and define how multicast data is sent to stations (STAs) by using a multicast association identifier (AID). The method includes: allocating, by an access point (AP), a corresponding multicast AID to STAs, where the multicast AID is set in a short media access control (MAC) header of a multicast packet; and sending, by the AP, the multicast packet to at least two STAs, so that the at least two STAs determine, according to the multicast AID, whether the multicast packet is a multicast packet corresponding to the at least two STAs, where the at least two STAs are in a same multicast group.

7 Claims, 9 Drawing Sheets

(51) Int. Cl.
*H04W 76/00* (2009.01)
*H04W 4/06* (2009.01)
*H04W 76/02* (2009.01)
*H04L 29/12* (2006.01)
*H04W 72/00* (2009.01)

(52) U.S. Cl.
CPC ....... *H04W 76/002* (2013.01); *H04W 76/021* (2013.01); *H04W 72/005* (2013.01)

(56) References Cited

U.S. PATENT DOCUMENTS

| | | | |
|---|---|---|---|
| 2010/0265864 A1 | 10/2010 | He et al. | |
| 2012/0044925 A1 | 2/2012 | Lee et al. | |
| 2012/0113903 A1* | 5/2012 | Kneckt | H04W 74/04 370/329 |
| 2013/0044607 A1* | 2/2013 | Liu | H04W 8/26 370/242 |
| 2013/0107895 A1* | 5/2013 | Wentink | H04L 69/04 370/477 |
| 2013/0155929 A1* | 6/2013 | Aboul-Magd | H04W 28/06 370/311 |
| 2013/0155952 A1* | 6/2013 | Chu | H04L 45/74 370/328 |
| 2013/0195001 A1* | 8/2013 | Liu | H04L 69/04 370/312 |
| 2013/0229969 A1* | 9/2013 | Quan | H04L 12/189 370/312 |
| 2013/0235773 A1* | 9/2013 | Wang | H04W 52/0206 370/311 |
| 2014/0112230 A1 | 4/2014 | Sammour et al. | |
| 2015/0131640 A1* | 5/2015 | Seok | H04W 28/06 370/338 |
| 2016/0113016 A1 | 4/2016 | Kim et al. | |

FOREIGN PATENT DOCUMENTS

| | | |
|---|---|---|
| CN | 101305578 A | 11/2008 |
| CN | 101827315 A | 9/2010 |
| CN | 101861715 A | 10/2010 |
| CN | 102195699 A | 9/2011 |
| CN | 102547592 A | 7/2012 |
| CN | 102714534 A | 10/2012 |
| WO | 2011072164 A2 | 6/2011 |

OTHER PUBLICATIONS

Foreign Communication From a Counterpart Application, PCT Application No. PCT/CN2013/088786, English Translation of International Search Report dated Feb. 27, 2014, 2 pages.

Foreign Communication From a Counterpart Application, PCT Application No. PCT/CN2013/088786, Written Opinion dated Feb. 27, 2014, 8 pages.

"MAC Header Compression," Qualcomm Inc, IEEE 802.11-12/0646r0, May 2012, 14 pages.

"Short MAC Header," Qualcomm Inc, IEEE 802.11-12/0857r0, Jul. 2012, 11 pages.

Foreign Communication From a Counterpart Application, Chinese Application No. 201310144338.X, Chinese Search Report dated Nov. 24, 2016, 2 pages.

Foreign Communication From a Counterpart Application, Chinese Application No. 201310144338.X, Chinese Office Action dated Dec. 5, 2016, 4 pages.

Foreign Communication From a Counterpart Application, Chinese Application No. 201310071466.6, Chinese Search Report dated Nov. 25, 2016, 2 pages.

Foreign Communication From a Counterpart Application, Chinese Application No. 201310071466.6, Chinese Office Action dated Dec. 6, 2016, 6 pages.

* cited by examiner

| Frame control field | Duration field | First address field | Second address field | Third address field | Sequence control field | Fourth address field | Quality of service control field | High throughput control field |

| Frame control field | First address field | Second address field | Sequence control field |

| Frame control field | First address field | Second address field | Sequence control field | Third address field | ns
MULTICAST PACKET TRANSMISSION METHOD, AND APPARATUS

CROSS-REFERENCE TO RELATED APPLICATIONS

This application is a continuation of International Patent Application No. PCT/CN2013/088786, filed on Dec. 6, 2013, which claims priority to Chinese Patent Application No. 201310071466.6, filed on Mar. 6, 2013 and Chinese Patent Application No. 201310144338.X, filed on Mar. 6, 2013, all of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the communications field, and in particular, to a multicast packet transmission method and an apparatus.

BACKGROUND

A wireless local area network (WLAN) is a computer local area network which uses a radio channel as a transmission medium, and is an important supplement and extension to wired networks. In an application scenario of 802.11ah, an access point (AP) can generally support 6000 stations (STAs). 802.11ah is a communications standard for wireless local area networks and is applied to a large number of sensor applications with low power consumption, for example, meter reading, environment monitoring, and smart household. Exemplarily, these STAs may be separately disposed on a water meter, an electricity meter, and a gas meter. The water meter, the electricity meter, and the gas meter may belong to a same company or different companies. By using a wireless AP, these companies can separately send information at a same interval or different intervals to the water meter, the electricity meter, and the gas meter, or update the water meter, the electricity meter, and the gas meter. Therefore, in the application scenario of 802.11ah, an AP can send multicast information at different intervals and of different content to different STAs. Currently, the 802.11ah standard, however, does not define how multicast data is sent to STAs by using a multicast association identifier (AID).

SUMMARY

Embodiments of the present invention provide a multicast packet transmission method and apparatus, and define how multicast data is sent to STAs by using a multicast AID.

The following technical solutions are used in the embodiments of the present invention:

According to a first aspect, an embodiment of the present invention provides a multicast packet transmission method, where the method includes: allocating, by an AP, a corresponding multicast AID to at least two STAs, where the multicast AID is set in a short media access control (MAC) header of a multicast packet; and sending, by the AP, the multicast packet to the at least two STAs, so that the at least two STAs determine, according to the multicast AID, whether the multicast packet is a multicast packet corresponding to the at least two STAs, where the at least two STAs are in a same multicast group.

In a first possible implementation manner, according to the first aspect, the method further includes: calculating, by the AP for the STAs, a corresponding multicast partial association identifier (PAID) of the STAs; and setting, by the AP, the multicast PAID into a physical layer convergence procedure protocol data unit (PPDU) frame of the multicast packet.

In a second possible implementation manner, with reference to the first aspect or the first possible implementation manner, if the PPDU frame format is a short preamble format, the multicast PAID is set in a signal field of the short preamble format; or if the PPDU frame format is a long preamble format, the multicast PAID is set in a signal A field of the long preamble format.

In a third possible implementation manner, with reference to the first aspect, the first possible implementation manner, or the second possible implementation manner, the short MAC header includes a frame control field, a first address field, a second address field, and a sequence control field, and the multicast AID is set in the first address field.

In a fourth possible implementation manner, with reference to the first aspect or the first possible implementation manner to the third possible implementation manner, a length of the first address field is 16 bits, where starting from the least significant bit of the first address field, the fourteenth bit is a flag bit, and the flag bit is used to indicate whether an AID is a multicast AID.

In a fifth possible implementation manner, with reference to the first aspect or the first possible implementation manner to the fourth possible implementation manner, before the sending, by the AP, the multicast packet to at least two STAs, the method further includes sending, by the AP, a broadcast signal to the STAs, so that the STAs learn that the AP is to send the multicast packet to the STAs.

According to a second aspect, an embodiment of the present invention provides a multicast packet transmission method, where the method includes: receiving, by a STA, a multicast packet sent by an AP, where the multicast packet is sent by the AP to at least two STAs which include the STA, and a multicast AID in the multicast packet is set in a short MAC header of the multicast packet; and determining, by the STA according to the multicast AID, whether the multicast packet is a multicast packet corresponding to the STA.

In a first possible implementation manner, according to the second aspect, the short MAC header includes a frame control field, a first address field, a second address field, and a sequence control field, and the multicast AID is set in the first address field.

In a second possible implementation manner, with reference to the second aspect or the first possible implementation manner, a length of the first address field is 16 bits, where starting from the least significant bit of the first address field, the fourteenth bit is the flag bit, and the flag bit is used to indicate whether an AID is a multicast AID.

In a third possible implementation manner, with reference to the second aspect, the first possible implementation manner, or the second possible implementation manner, before the receiving, by the at least two STAs, the multicast packet sent by the AP, the method further includes: receiving, by the STAs, a broadcast signal sent by the AP; and learning, by the STAs, that the AP is to send the multicast packet to the STAs.

In a fourth possible implementation manner, with reference to the second aspect or the first possible implementation manner to the third possible implementation manner, the method further includes, if a multicast PAID is set in a multicast PPDU frame format, determining, by the STA according to the multicast PAID, whether the multicast packet is a multicast packet corresponding to the STA.

According to a third aspect, an embodiment of the present invention provides an AP, where the AP includes: a processing module configured to allocate a corresponding multicast AID to at least two STAs, where the multicast AID is set in a short MAC header of a multicast packet; and a sending module configured to send the multicast packet to the at least two STAs, so that the at least two STAs determine, according to the multicast AID, whether the multicast packet is a multicast packet corresponding to the at least two STAs, where the at least two STAs are in a same multicast group.

In a first possible implementation manner, according to the third aspect, the processing module is further configured to calculate a corresponding multicast PAID of the STAs for the STAs, and set the multicast PAID into a physical layer convergence PPDU frame of the multicast packet.

In a second possible implementation manner, with reference to the third aspect or the first possible implementation manner, if the PPDU frame format is a short preamble format, the multicast PAID is set in a signal field of the short preamble format; or if the PPDU frame format is a long preamble format, the multicast PAID is set in a signal A field of the long preamble format.

In a third possible implementation manner, with reference to the third aspect, the first possible implementation manner, or the second possible implementation manner, the short MAC header includes a frame control field, a first address field, a second address field, and a sequence control field, and the multicast AID is set in the first address field.

In a fourth possible implementation manner, with reference to the third aspect or the first possible implementation manner to the third possible implementation manner, a length of the first address field is 16 bits, where starting from the least significant bit of the first address field, the fourteenth bit is the flag bit, and the flag bit is used to indicate whether an AID is a multicast AID.

In a fifth possible implementation manner, with reference to the third aspect or the first possible implementation manner to the fourth possible implementation manner, the sending module is further configured to send a broadcast signal to the STAs, so that the STAs learn that the AP is to send the multicast packet to the STAs.

According to a fourth aspect, an embodiment of the present invention provides a STA, where the STA includes: a receiving unit configured to receive a multicast packet sent by an AP, where the multicast packet is sent by the AP to at least two STAs which include the STA, and a multicast AID in the multicast packet is set in a short MAC header of the multicast packet; and a determining unit configured to determine, according to the multicast AID, whether the multicast packet is a multicast packet corresponding to the STA.

In a first possible implementation manner, with reference to the fourth aspect, the short MAC header includes a frame control field, a first address field, a second address field, and a sequence control field, and the multicast AID is set in the first address field.

In a second possible implementation manner, with reference to the fourth aspect or the first possible implementation manner, a length of the first address field is 16 bits, where starting from the least significant bit of the first address field, the fourteenth bit is the flag bit, and the flag bit is used to indicate whether an AID is a multicast AID.

In a third possible implementation manner, with reference to the fourth aspect, the first possible implementation manner, or the second possible implementation manner, the STA further includes: the receiving unit, further configured to receive a broadcast signal sent by the AP; and an acquiring unit configured to learn that the AP is to send the multicast packet to the STA.

In a fourth possible implementation manner, with reference to the fourth aspect or the first possible implementation manner to the third possible implementation manner, the determining unit is further configured to, if a multicast PAID is set in a multicast PPDU frame format, determine, according to the multicast PAID, whether the multicast packet is a multicast packet corresponding to the STA.

According to yet another aspect, an embodiment of the present invention provides a physical (PHY) layer encapsulation method for a multicast packet, where the method includes: obtaining, by an AP by means of calculation according to a multicast AID of STAs, a multicast PAID of the STAs; and setting, by the AP, the multicast PAID into a physical layer convergence PPDU frame of the multicast packet.

According to still another aspect, an embodiment of the present invention further provides a multicast PPDU frame transmission method, where the method includes: receiving, by a STA, a physical layer convergence PPDU frame of a multicast packet sent by an AP, where the PPDU frame includes a first multicast PAID; and calculating, by the STA, a second multicast PAID according to a multicast AID allocated by the AP, comparing whether the first multicast PAID and the second multicast PAID are the same, and determining, according to a comparison result, whether the multicast PPDU frame is a multicast PPDU frame corresponding to the STA.

According to yet another aspect, an embodiment of the present invention discloses an AP, where the AP includes: a module which obtains, by means of calculation according to a multicast AID of STAs, a multicast PAID of the STAs; and a module which sets the multicast PAID into a physical layer convergence PPDU frame of the multicast packet.

According to still another aspect, an embodiment of the present invention further discloses a STA, where the STA includes: a module which receives a physical layer convergence PPDU frame of a multicast packet sent by an AP, where the PPDU frame includes a first multicast PAID; and a module which calculates a second multicast PAID according to a multicast AID allocated by the AP, compares whether the first multicast PAID and the second multicast PAID are the same, and determines, according to a comparison result, whether the multicast PPDU frame is a multicast PPDU frame corresponding to the STA.

According to the multicast packet transmission method and apparatus provided in the embodiments of the present invention, an AP allocates a corresponding multicast AID to STAs, where the multicast AID is set in a short MAC header of a multicast packet; and the AP sends the multicast packet to at least two STAs, so that the at least two STAs determine, according to the multicast AID, whether the multicast packet is a multicast packet corresponding to the at least two STAs, where the at least two STAs are in a same multicast group. With this solution, because an AP allocates a corresponding multicast AID to STAs and sends a multicast packet to at least two STAs, the at least two STAs determine, according to the multicast AID, whether the multicast packet is a multicast packet corresponding to the at least two STAs. In this way, how multicast data is sent to STAs by using a multicast AID is defined.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figures 1, 2, 3:
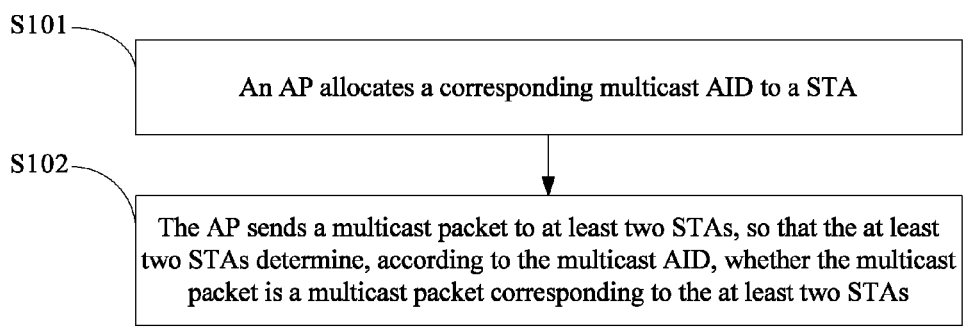
FIG. 1 is flowchart 1 of a multicast packet transmission method according to an embodiment of the present invention.
FIG. 2 is a schematic structural diagram of a traditional MAC header.
FIG. 3 is schematic structural diagram 1 of a short MAC header according to an embodiment of the present invention.

An embodiment of the present invention provides a multicast packet transmission method. As shown in FIG. 1, the method includes:

S101. An AP allocates a corresponding multicast AID to STAs.

The multicast AID is set in a short MAC header of a multicast packet, and optionally, a first flag is set in a flag bit of the multicast AID.

A WLAN is a computer local area network which uses a radio channel as a transmission medium, and is an important supplement and extension to wired networks. In an application scenario of 802.11ah, an AP can generally support 6000 STAs. 802.11ah is a communications standard for WLANs and is applied to a large number of sensor applications with low power consumption, for example, meter reading, environment monitoring, and smart household.

In an application scenario of 802.11ah, when an AP is to send multicast data to multiple STAs, the AP first needs to process the data to be sent. First, the data is encapsulated at a MAC layer, and meanwhile, an AID is set in a short MAC header of the packet. Then, the data encapsulated at the MAC layer is sent to a PHY layer for encapsulation, where a specific encapsulating process is described in a following embodiment, and details are not described here.

It should be noted that a format of a traditional MAC header is shown in FIG. 2; the traditional MAC header includes a frame control field, a duration field or a flag field, a first address field, a second address field, a third address field, a sequence control field, a fourth address field, a quality of service control field, and a high throughput control field, where a length of the frame control field, a length of the duration field, a length of the sequence control field, and a length of the quality of service control field are all 2 bytes; a length of the first address field, a length of the second address field, a length of the third address field, and a length of the fourth address field are all 6 bytes; and a length of the high throughput control field is 4 bytes.

However, in an application scenario of 802.11ah, an application with low power consumption can be more effectively supported if the short MAC header is adopted. As shown in FIG. 3, the short MAC header includes a frame control field, a first address field, a second address field, and a sequence control field, where a length of the frame control field, a length of the first address field, and a length of the sequence control field are all 2 bytes, and a length of the second address field is 6 bytes. In addition, the AID is set in the first address field, and a basic service set identifier (BSSID) is set in the second address field.

Figures 4, 5:
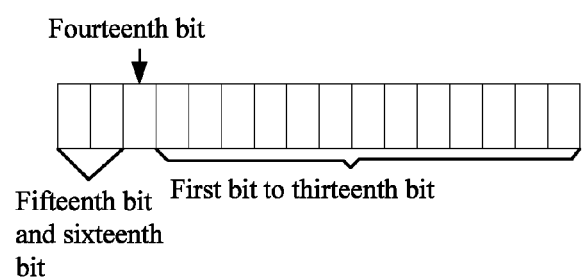
FIG. 4 is schematic structural diagram 2 of a short MAC header according to an embodiment of the present invention.
FIG. 5 is a schematic structural diagram of an AID according to an embodiment of the present invention.

It should be noted that, according to a user policy, the short MAC header provided in this embodiment of the present invention may further include a third address field, and as shown in FIG. 4, a length of the third address field is 6 bytes.

Compared with the traditional MAC header, the short MAC header does not include the duration field, the quality of service control field, the high throughput control field, and the fourth address field, which can not only reduce a length of the MAC header to improve data transmission efficiency, but also reduce power consumption of the STA to save energy.

It should be added that a format that the AID is set in the first address field is shown in FIG. 5, where the length of the first address field is 2 bytes, that is, 16 bits. According to a stipulation, starting from the least significant bit of the first address field, the first bit to the thirteenth bit are set to be a sketch value of the AID; starting from the least significant bit of the first address field, the fourteenth bit is a flag bit, where the flag bit is used to indicate whether the AID is a multicast AID; and starting from the least significant bit of the first address field, the fifteenth bit and the sixteenth bit are both set to a numeric 1.

When a packet is to be sent as a multicast packet, the AP allocates a corresponding multicast AID to the STA, where the multicast AID is set in a short MAC header of the multicast packet; optionally, a first flag is set in a flag bit of the multicast AID, and a value of the first flag is 1.

S102. The AP sends a multicast packet to at least two STAs, so that the at least two STAs determine, according to the multicast AID, whether the multicast packet is a multicast packet corresponding to the at least two STAs.

The at least two STAs are in a same multicast group.

The AP sends the multicast packet to the at least two STAs, so that the at least two STAs determine, according to the multicast AID, whether the multicast packet is a multicast packet corresponding to the at least two STAs.

It should be noted that the AID provided in this embodiment of the present invention is compiled in binary format, and the first flag is used to indicate whether the packet is a multicast packet. Therefore, the value of the first flag is 1. When the first flag is not set in the flag bit, it indicates that the packet is not a multicast packet and cannot be sent to STAs in a multicast manner.

It should be added that the value of the first flag varies with different user policies, and the value of the first flag may be 1 or may be 0 or any other value. The present invention is not limited.

According to the multicast packet transmission method provided in this embodiment of the present invention, an AP allocates a corresponding multicast AID to STAs, where the multicast AID is set in a short MAC header of a multicast packet, and a first flag is set in a flag bit of the multicast AID; and the AP sends the multicast packet to at least two STAs, so that the at least two STAs determine, according to the multicast AID, whether the multicast packet is a multicast packet corresponding to the at least two STAs, where the at least two STAs are in a same multicast group. With this solution, because an AP allocates a corresponding multicast AID to a STA and sends a multicast packet to at least two STAs, the at least two STAs determine, according to the multicast AID, whether the multicast packet is a multicast packet corresponding to the at least two STAs. In this way, how multicast data is sent to a STA by using a multicast AID is defined.

Figure 6:
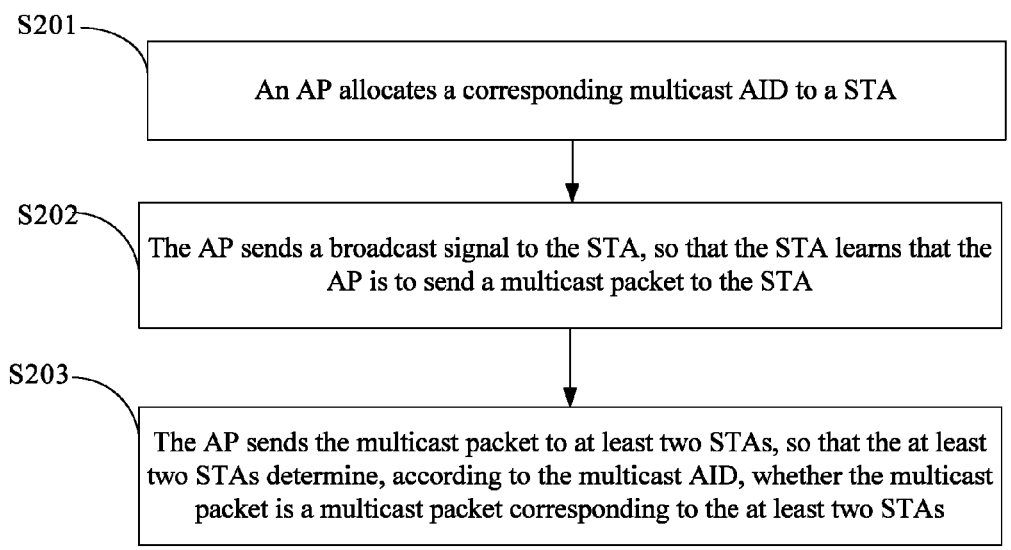
FIG. 6 is flowchart 2 of a multicast packet transmission method according to an embodiment of the present invention.

An embodiment of the present invention provides a multicast packet transmission method. As shown in FIG. 6, the method includes:

S201. An AP allocates a corresponding multicast AID to STAs.

The multicast AID is set in a short MAC header of a multicast packet, and a first flag is set in a flag bit of the multicast AID.

A WLAN is a computer local area network which uses a radio channel as a transmission medium, and is an important supplement and extension to wired networks. In an application scenario of 802.11ah, an AP can generally support 6000 STAs. 802.11ah is a communications standard for WLANs and is applied to a large number of sensor applications with low power consumption, for example, meter reading, environment monitoring, and smart household.

In an application scenario of 802.11ah, when an AP is to send multicast data to multiple STAs, the AP first needs to process the data to be sent. First, the data is encapsulated at a MAC layer, and meanwhile, an AID is set in a short MAC header of the packet. Then, the data encapsulated at the MAC layer is sent to a PHY layer for encapsulation.

The following successively describes processes of encapsulating data at the MAC layer and at the PHY layer.

A traditional MAC header includes a frame control field, a duration field or a flag field, a first address field, a second address field, a third address field, a sequence control field, a fourth address field, a quality of service control field, and a high throughput control field, where a length of the frame control field, a length of the duration field, a length of the sequence control field, and a length of the quality of service control field are all 2 bytes; a length of the first address field, a length of the second address field, a length of the third address field, and a length of the fourth address field are all 6 bytes; and a length of the high throughput control field is 4 bytes.

However, in an application scenario of 802.11ah, adoption of the short MAC header can more effectively support an application with low power consumption. The short MAC header includes a frame control field, a first address field, a second address field, and a sequence control field, where a length of the frame control field, a length of the first address field, and a length of the sequence control field are all 2 bytes, and a length of the second address field is 6 bytes. In addition, the AID is set in the first address field.

It should be noted that, according to a user policy, the short MAC header provided in this embodiment of the present invention may further include a third address field, and a length of the third address field is 6 bytes.

Compared with the traditional MAC header, the short MAC header does not include the duration field, the quality of service control field, the high throughput control field, and the fourth address field, which can not only reduce a length of the MAC header to improve data transmission efficiency, but also reduce power consumption of the STA to save energy.

Figure 7:
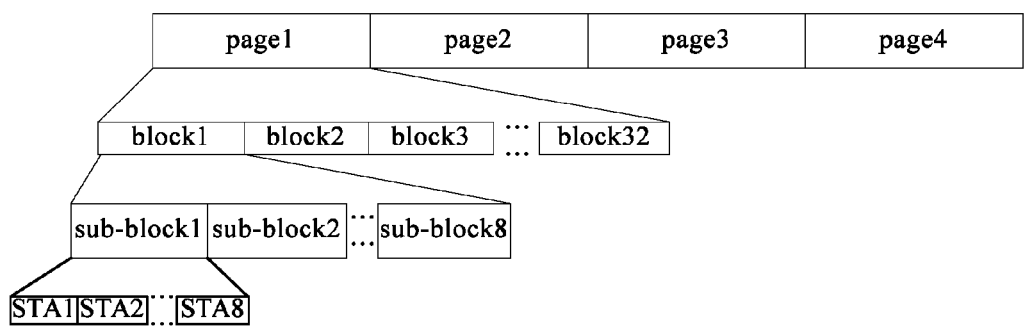
FIG. 7 is a schematic structural diagram of a sketch value of an AID according to an embodiment of the present invention.

It should be added that the AID is set in the first address field, where the length of the first address field is 2 bytes, that is, 16 bits. According to a stipulation, the first bit to the thirteenth bit of the first address field are set to be a sketch value of the AID. Because up to 6000 nodes need to be supported in the 802.11ah scenario, when the AID sketch values are allocated to a large number of nodes, the nodes are divided by layer according to three levels, that is, page, block, and sub-block, as shown in FIG. 7. The first address field has at most 4 pages, which occupy 2 bits; under each page, there are 32 blocks, occupying 5 bits; under each block, there are 8 sub-blocks, occupying 3 bits; and under each sub-block, there can be 8 STAs, occupying 3 bits. Therefore, each AID only needs to indicate a page, a block, and a sub-block to which a STA belongs, and a specific position in the sub-block, and then a sketch value, corresponding to the STA, of the AID can be indicated.

Further, starting from the least significant bit of the first address field, the fourteenth bit is a flag bit, where the flag bit is used to indicate whether the AID is a multicast AID; and starting from the significant bit of the first address field, the fifteenth bit and the sixteenth bit are both set to a numeric 1.

After the AID is set in a short MAC header of a multicast packet, the AP sends the data encapsulated at the MAC layer to the PHY layer for encapsulation.

The 802.11ah standard supports the following several bandwidths: 1 megahertz (MHz), 2 MHz, 4 MHz, 8 MHz, and 16 MHz, and the 802.11ah standard defines three PPDU frame formats. These three frame formats are respectively a 1 MHz frame format, a greater than or equal to 2 MHz short preamble format, and a greater than or equal to 2 MHz long preamble format, where the short preamble format can only be used for single user (SU) communication; and the long preamble format can be used for not only SU communication but also multiple user (MU) communication.

Figure 8:
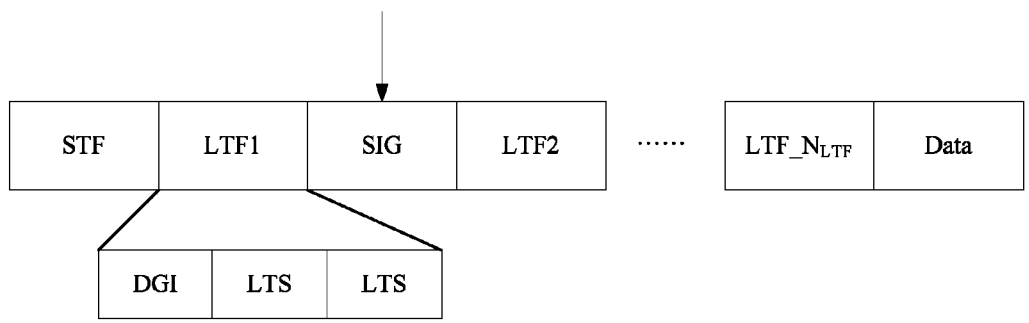
FIG. 8 is schematic structural diagram 1 of a PPDU frame format according to an embodiment of the present invention.

As shown in FIG. 8, the greater than or equal to 2 MHz short preamble format includes: a short training field (STF) used for initial PPDU detection, automatic gain control, rough frequency offset estimation, and time synchronization; a long training field 1 (LTF1) used for channel estimation, accurate frequency offset estimation, and time synchronization; a long training field 2 (LTF2) together with the LTF1 and long training field $N_{LTF}$ (LTF_$N_{LTF}$) are used for channel estimation of multiple spatial flows, accurate frequency offset estimation, and time synchronization, where $N_{LTF}$ refers to the specific number of LTF fields and is related to the number of spatial flows; and a signal (SIG) used to transmit some key information, such as a bandwidth, the number of spatial flows, and a modulation scheme, required by a receive side for depacketization.

Figure 9:
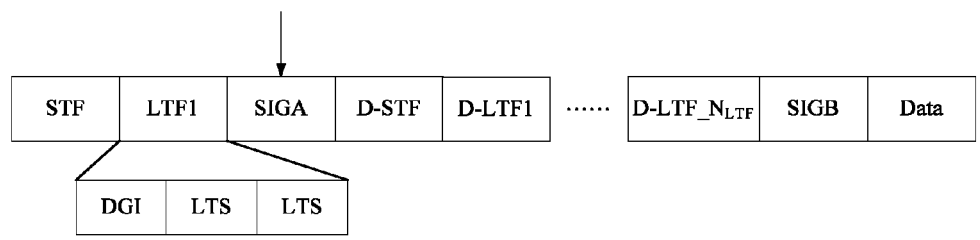
FIG. 9 is schematic structural diagram 2 of a PPDU frame format according to an embodiment of the present invention.

As shown in FIG. 9, the greater than or equal to 2 MHz long preamble format includes: an STF; an LTF1; a signal A (SIGA) used to transmit key information required by the receive side to depacketize an SU packet, or transmit key information shared by multiple users when an MU packet is depacketized; a short training field for data (D-STF) used to improve automatic gain control; and a signal B (SIGB) which, in SU mode, is identical to a D-LTF1 and can improve performance of channel estimation, and in MU mode, is used to transmit key information specific to each user.

When the multicast data encapsulated at the MAC layer is encapsulated at the PHY layer, the AP first calculates a corresponding multicast PAID of the STAs for the STAs, where a length of the PAID is 9 bits and is obtained by means of calculation after the AID is compressed. A same PAID can be obtained by means of calculation after multiple AIDs are compressed, and the same PAID is used for packet address detection at the PHY layer on the receive side. The multicast PAID can be obtained by means of calculation according to formula (1), and formula (1) is as follows:

$$(dec(AID[0:8]) + dec(BSSID[44:47] \oplus BSSID[40:43]) \times 2^5) \bmod 2^9 \quad \text{Formula (1)},$$

where $\oplus$ represents a bitwise exclusive or (XOR) operation; mod X represents a modulo X operation; dec( ) represents a decimal conversion operation; AID[0:8] represents bits 0 to 8 of the AID; and BSSID[44:47] represents bits 44 to 47 of a BSSID.

After the PAID to be set in the PPDU frame format is obtained by means of calculation, if the multicast PAID meets a preset condition, the AP sets the multicast PAID into the physical layer convergence PPDU frame format of the multicast packet. If the multicast PAID does not meet the preset condition, the AP does not set the multicast PAID into the PPDU frame format of the multicast packet. The preset condition means that the PAID obtained by means of calculation according to formula (1) is not equal to a first preset value, and that the PAID obtained by means of calculation is not equal to a second preset value, where the first preset value is a value obtained by means of calculation according to formula (2), and the second preset value is a value obtained by means of calculation according to formula (3):

$$(dec(BSSID[39:47]) \bmod (2^9-1)) + 1 \quad \text{Formula (2), and}$$

$$(dec(\text{Overlapping BSSID}[39:47]) \bmod (2^9-1)) + 1 \quad \text{Formula (3)}.$$

Overlapping BSSID refers to an identifier of an adjacent basic service set (BSS) which overlaps a current BSS in coverage, that is, a MAC address of an adjacent AP.

Correspondingly, after the PAID to be set in the PPDU frame format is obtained by means of calculation, if the PAID does not meet the preset condition, the PAID is not to be set in the PPDU frame format.

It should be added that, if the PPDU frame format is the short preamble format, the multicast PAID is set in the signal field SIG (a portion indicated by an arrow in FIG. 8) of the short preamble format; or, if the PPDU frame format is the long preamble format, the multicast PAID is set in the signal A field SIGA (a portion indicated by an arrow in FIG. 9) of the long preamble format.

When a packet after being encapsulated at the MAC layer and the PHY layer is to be sent as a multicast packet, the AP allocates a corresponding multicast AID to the STA, where the multicast AID is set in a short MAC header of the multicast packet, a first flag is set in a flag bit of the multicast AID, and a value of the first flag is 1.

S202. The AP sends a broadcast signal to the STAs, so that the STAs learn that the AP is to send a multicast packet to the STAs.

Before the AP sends the multicast packet to at least two STAs, the AP sends, to the STAs, the broadcast signal which carries delivery traffic indication map information, so that the STAs learn that the AP is to send the multicast packet to the STAs.

The broadcast signal is sent by using a delivery traffic indication map (DTIM) broadcast signal of a beacon frame, where the beacon is a management frame which is periodically broadcast by the AP, and the DTIM is a field of the broadcast signal of the beacon frame sent by the AP.

S203. The AP sends the multicast packet to at least two STAs, so that the at least two STAs determine, according to the multicast AID, whether the multicast packet is a multicast packet corresponding to the at least two STAs.

The at least two STAs are in a same multicast group.

The AP sends the multicast packet to the at least two STAs, so that the at least two STAs determine, according to the multicast AID, whether the multicast packet is a multicast packet corresponding to the at least two STAs.

It should be added that the value of the first flag varies with different user policies, and the value of the first flag may be 1 or may be 0 or any other value. The present invention is not limited.

According to the multicast packet transmission method provided in this embodiment of the present invention, an AP allocates a corresponding multicast AID to STAs, where the multicast AID is set in a short MAC header of a multicast packet, and a first flag is set in a flag bit of the multicast AID; and the AP sends the multicast packet to at least two STAs, so that the at least two STAs determine, according to the multicast AID, whether the multicast packet is a multicast packet corresponding to the at least two STAs, where the at least two STAs are in a same multicast group. With this solution, because an AP allocates a corresponding multicast AID to STAs and sends a multicast packet to at least two STAs, the at least two STAs determine, according to the multicast AID, whether the multicast packet is a multicast packet corresponding to the at least two STAs. In this way, how multicast data is sent to STAs by using a multicast AID is defined.

Figure 10:
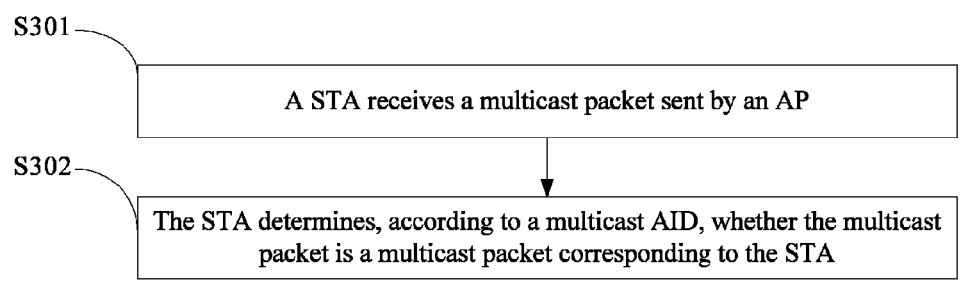
FIG. 10 is flowchart 3 of a multicast packet transmission method according to an embodiment of the present invention.

An embodiment of the present invention provides a packet transmission method. As shown in FIG. 10, the method includes:

S301. A STA receives a multicast packet sent by an AP.

The STA receives the multicast packet sent by the AP, where the multicast packet is sent by the AP to at least two STAs which include the STA, a multicast AID in the multicast packet is set in a short MAC header of the multicast packet, and a first flag is set in a flag bit of the multicast AID.

S302. The STA determines, according to a multicast AID, whether the multicast packet is a multicast packet corresponding to the STA.

The STA determines, according to the multicast AID, whether the multicast packet is a multicast packet corresponding to the STA; if the multicast packet is a multicast packet corresponding to the STA, the STA continues to receive the multicast packet; and if the multicast packet is not a multicast packet corresponding to the STA, the STA discards the multicast packet.

It should be noted that a PAID is set in a PPDU frame format, and therefore the STA may also determine, according to the PAID, whether a packet is a packet corresponding to the STA. The present invention is not limited.

According to the multicast packet transmission method provided in this embodiment of the present invention, a STA receives a multicast packet sent by an AP, where the multicast packet is sent by the AP to at least two STAs which include the STA, a multicast AID in the multicast packet is set in a short MAC header of the multicast packet, and a first flag is set in a flag bit of the multicast AID; and the STA determines, according to the multicast AID, whether the multicast packet is a multicast packet corresponding to the STA. With this solution, because an AP allocates a corresponding multicast AID to STAs and sends a multicast packet to at least two STAs, the at least two STAs determine, according to the multicast AID, whether the multicast packet is a multicast packet corresponding to the at least two STAs. In this way, how multicast data is sent to STAs by using a multicast AID is defined.

Figure 11:
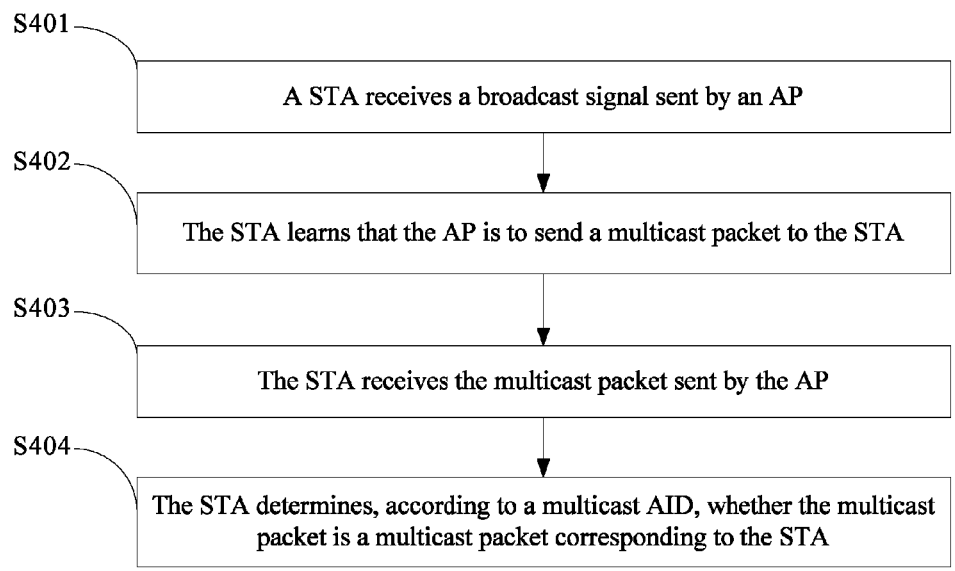
FIG. 11 is flowchart 4 of a multicast packet transmission method according to an embodiment of the present invention.

An embodiment of the present invention provides a packet transmission method. As shown in FIG. 11, the method includes:

S401. A STA receives a broadcast signal sent by an AP.

S402. The STA learns that the AP is to send a multicast packet to the STA.

S403. The STA receives the multicast packet sent by the AP.

The multicast packet is sent by the AP to at least two STAs which include the STA, and a multicast AID in the multicast packet is set in a short MAC header of the multicast packet, and a first flag is set in a flag bit of the multicast AID.

The short MAC header includes a frame control field, a first address field, a second address field, and a sequence control field; and the multicast AID is set in the first address field. A length of the first address field is 16 bits, where starting from the least significant bit of the first address field, the fourteenth bit is the flag bit, where the flag bit is used to indicate whether an AID is a multicast AID.

S404. The STA determines, according to a multicast AID, whether the multicast packet is a multicast packet corresponding to the STA.

The STA determines, according to the multicast AID, whether the multicast packet is a multicast packet corresponding to the STA; if the multicast packet is a multicast packet corresponding to the STA, the STA continues to receive the multicast packet; and if the multicast packet is not a multicast packet corresponding to the STA, the STA discards the multicast packet.

It should be noted that a PAID is set in a PPDU frame format, and therefore the STA may also determine, according to the PAID, whether a packet is a packet corresponding to the STA. The present invention is not limited.

According to the multicast packet transmission method provided in this embodiment of the present invention, a STA receives a multicast packet sent by an AP, where the multicast packet is sent by the AP to at least two STAs which include the STA, a multicast AID in the multicast packet is set in a short MAC header of the multicast packet, and a first flag is set in a flag bit of the multicast AID; and the STA determines, according to the multicast AID, whether the multicast packet is a multicast packet corresponding to the STA. With this solution, because an AP allocates a corresponding multicast AID to STAs and sends a multicast packet to at least two STAs, the at least two STAs determine, according to the multicast AID, whether the multicast packet is a multicast packet corresponding to the at least two STAs. In this way, how multicast data is sent to STAs by using a multicast AID is defined.

Figure 12:
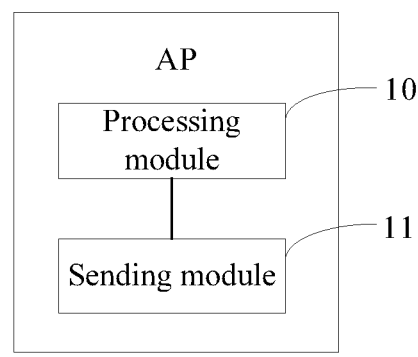
FIG. 12 is a schematic structural diagram of an AP according to an embodiment of the present invention.

An embodiment of the present invention provides an AP. As shown in FIG. 12, the AP includes: a processing module 10 configured to allocate a corresponding multicast AID to STAs, where the multicast AID is set in a short MAC header of a multicast packet, and a first flag is set in a flag bit of the multicast AID; and a sending module 11 configured to send the multicast packet to at least two STAs, so that the at least two STAs determine, according to the multicast AID, whether the multicast packet is a multicast packet corresponding to the at least two STAs, where the at least two STAs are in a same multicast group.

Further, the processing module 10 is further configured to calculate a corresponding multicast PAID of the STAs for the STAs, and set the multicast PAID into a physical layer convergence PPDU frame format of the multicast packet.

Further, if the PPDU frame format is a short preamble format, the multicast PAID is set in a signal field of the short preamble format; or if the PPDU frame format is a long preamble format, the multicast PAID is set in a signal A field of the long preamble format.

Further, the short MAC header includes a frame control field, a first address field, a second address field, and a sequence control field; and the multicast AID is set in the first address field.

Further, a length of the first address field is 16 bits, where starting from the least significant bit of the first address field, the fourteenth bit is the flag bit, where the flag bit is used to indicate whether an AID is a multicast AID.

Further, the sending module 11 is further configured to send a broadcast signal to the STAs, so that the STAs learn that the AP is to send the multicast packet to the STAs.

The AP provided in this embodiment of the present invention includes a processing module configured to allocate a corresponding multicast AID to STAs, where the multicast AID is set in a short MAC header of a multicast packet, and a first flag is set in a flag bit of the multicast AID; and a sending module configured to send the multicast packet to at least two STAs, so that the at least two STAs determine, according to the multicast AID, whether the multicast packet is a multicast packet corresponding to the at least two STAs, where the at least two STAs are in a same multicast group. With this solution, because an AP allocates a corresponding multicast AID to STAs and sends a multicast packet to at least two STAs, the at least two STAs determine, according to the multicast AID, whether the multicast packet is a multicast packet corresponding to the at least two STAs. In this way, how multicast data is sent to STAs by using a multicast AID is defined.

Figure 13:
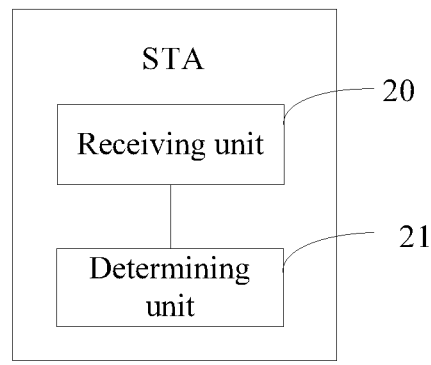
FIG. 13 is schematic structural diagram 1 of a STA according to an embodiment of the present invention.

An embodiment of the present invention provides a STA. As shown in FIG. 13, the STA includes: a receiving unit 20 configured to receive a multicast packet sent by an AP, where the multicast packet is sent by the AP to at least two STAs which include the STA, a multicast AID in the multicast packet is set in a short MAC header of the multicast packet, and a first flag is set in a flag bit of the multicast AID; and a determining unit 21 configured to determine, according to the multicast AID, whether the multicast packet is a multicast packet corresponding to the STA.

Further, the short MAC header includes a frame control field, a first address field, a second address field, and a sequence control field; and the multicast AID is set in the first address field.

Further, a length of the first address field is 16 bits, where starting from the least significant bit of the first address field, the fourteenth bit is the flag bit, where the flag bit is used to indicate whether an AID is a multicast AID.

Figure 14:
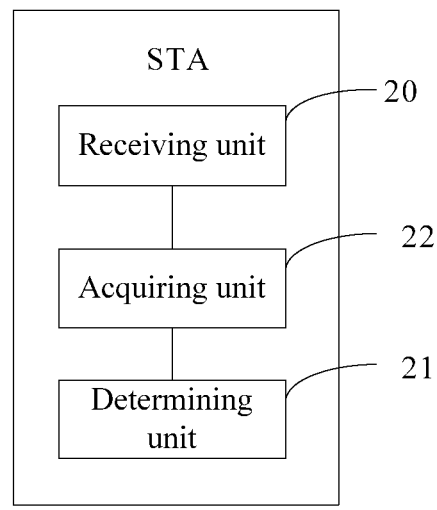
FIG. 14 is schematic structural diagram 2 of a STA according to an embodiment of the present invention.

Further, as shown in FIG. 14, the STA further includes: the receiving unit 20 further configured to receive a broadcast signal sent by the AP; and an acquiring unit 22 configured to learn that the AP is to send the multicast packet.

Further, the determining unit 21 is further configured to determine, according to a multicast PAID if the multicast PAID is set in a multicast PPDU frame format, whether the multicast packet is a multicast packet corresponding to the STA.

The STA provided in this embodiment of the present invention includes: a receiving unit configured to receive a multicast packet sent by an AP, where the multicast packet is sent by the AP to at least two STAs which include the STA, a multicast AID in the multicast packet is set in a short MAC header of the multicast packet, and a first flag is set in a flag bit of the multicast AID; and a determining unit configured to determine, according to the multicast AID, whether the multicast packet is a multicast packet corresponding to the STA. With this solution, because an AP allocates a corresponding multicast AID to STAs and sends a multicast packet to at least two STAs, the at least two STAs determine, according to the multicast AID, whether the multicast packet is a multicast packet corresponding to the at least two STAs. In this way, how multicast data is sent to STAs by using a multicast AID is defined.

Figure 15:
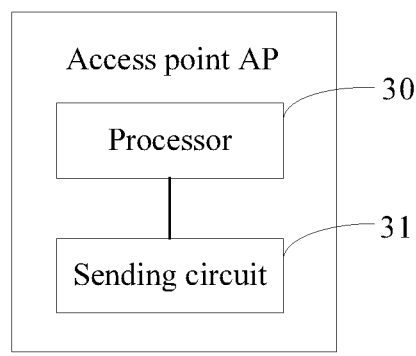
FIG. 15 is a schematic structural diagram of an AP according to another embodiment of the present invention.

An embodiment of the present invention provides an AP. As shown in FIG. 15, the AP includes: a processor 30 configured to allocate a corresponding multicast AID to STAs, where the multicast AID is set in a short MAC header of a multicast packet, and a first flag is set in a flag bit of the multicast AID; and a sending circuit 31 configured to send the multicast packet to at least two STAs, so that the at least two STAs determine, according to the multicast AID, whether the multicast packet is a multicast packet corresponding to the at least two STAs, where the at least two STAs are in a same multicast group.

The processor 30 may also be referred to as a central processing unit (CPU). The methods disclosed in the foregoing embodiments of the present invention may be applied to the processor 30, or implemented by the processor 30 in cooperation with functional circuits or devices. The processor 30 may be an integrated circuit chip and has a signal processing capability. In an implementation process, the steps in the foregoing methods may be completed by using an integrated logic circuit of hardware in the processor 30 or instructions in the form of software. The processor 30 may be a general processor, a digital signal processor (DSP), an application-specific integrated circuit (ASIC), a field programmable gate array (FPGA) or another programmable logic component, a discrete gate or a transistor logic component, or a discrete hardware component, which can implement or control the execution of the methods, steps, and logical block diagrams disclosed in the embodiments of the present invention. The general processor may be a microprocessor, or the processor may also be any conventional processor or the like. The steps of the methods disclosed in the embodiments of the present invention may be directly executed by a hardware decoding processor, or executed by a combination of hardware and software modules in a decoding processor. The software module may be located in a mature storage medium in the art, such as a random access memory, a flash memory, a read-only memory, a programmable read-only memory or an electrically erasable programmable memory, or a register.

Further, the processor 30 is further configured to calculate a corresponding multicast PAID of the STAs for the STAs, and set the multicast PAID into a physical layer convergence PPDU frame format of the multicast packet.

Further, if the PPDU frame format is a short preamble format, the multicast PAID is set in a signal field of the short preamble format; or if the PPDU frame format is a long preamble format, the multicast PAID is set in a signal A field of the long preamble format.

Further, the short MAC header includes a frame control field, a first address field, a second address field, and a sequence control field; and the multicast AID is set in the first address field.

Further, a length of the first address field is 16 bits, where starting from the least significant bit of the first address field, the fourteenth bit is the flag bit, where the flag bit is used to indicate whether an AID is a multicast AID.

Further, the sending circuit 31 is further configured to send a broadcast signal to the STAs, so that the STAs learn that the AP is to send the multicast packet to the STAs.

Figure 16:
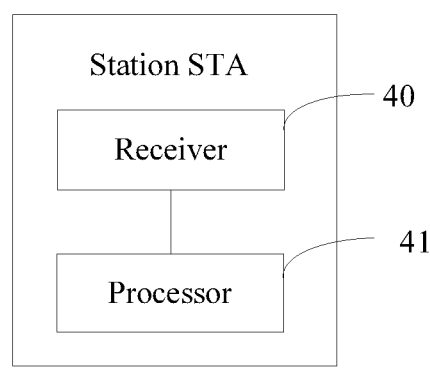
FIG. 16 is a schematic structural diagram of a STA according to another embodiment of the present invention.

An embodiment of the present invention further provides a STA. As shown in FIG. 16, the STA includes: a receiver 40 configured to receive a multicast packet sent by an AP, where the multicast packet is sent by the AP to at least two STAs which include the STA, a multicast AID in the multicast packet is set in a short MAC header of the multicast packet, and a first flag is set in a flag bit of the multicast AID; and a processor 41 configured to determine, according to the multicast AID, whether the multicast packet is a multicast packet corresponding to the STA.

The methods disclosed in the foregoing embodiments of the present invention may be applied to the processor 41, or implemented by the processor 41 cooperating with each functional circuit or device. The processor 41 may be an integrated circuit chip and has a signal processing capability. In an implementation process, the steps in the foregoing methods may be completed by using an integrated logic circuit of hardware in the processor 41 or an instruction in the form of software. The processor 41 may be a general processor, a DSP, an ASIC, a FPGA or another programmable logic component, a discrete gate or a transistor logic component, or a discrete hardware component, which can implement or control the execution of the methods, steps, and logical block diagrams disclosed in the embodiments of the present invention. The general processor may be a microprocessor, or the processor may also be any conventional processor and the like. The steps of the methods disclosed in the embodiments of the present invention may be directly executed by a hardware decoding processor, or executed by a combination of hardware and software modules in a decoding processor. The software module may be located in a mature storage medium in the art, such as a random access memory (RAM), a flash memory, a read-only memory (ROM), a programmable read-only memory or an electrically erasable programmable memory, or a register.

Further, the short MAC header includes a frame control field, a first address field, a second address field, and a sequence control field; and the multicast AID is set in the first address field.

Further, a length of the first address field is 16 bits, where starting from the least significant bit of the first address field, the fourteenth bit is the flag bit, where the flag bit is used to indicate whether an AID is a multicast AID.

Further, the receiver 40 is further configured to receive a broadcast signal sent by the AP.

The processor 41 is further configured to learn that the AP is to send the multicast packet.

Further, the processor 41 is further configured to determine, according to a multicast PAID if the multicast PAID is set in a multicast PPDU frame format, whether the multicast packet is a multicast packet corresponding to the STA.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, and are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A physical layer encapsulation method for a multicast packet, comprising:
   obtaining, by an access point (AP) by means of calculation according to a multicast association identifier (AID) of stations (STAs), a multicast partial association identifier (PAID) of the STAs, wherein the multicast PAID is calculated as a function of the multicast AID and a basic service set identifier (BSSID); and
   setting, by the AP, the multicast PAID into a physical layer convergence procedure protocol data unit (PPDU) frame of the multicast packet when the multicast PAID meets a preset condition, wherein the preset condition comprises the multicast PAID not being equal to a first preset value and not being equal to a second preset value, wherein the first preset value is calculated as a function of the BSSID, and wherein the second preset value is calculated as a function of an overlapping BSSID.

2. The method according to claim 1, wherein the multicast PAID is set in a signal field of a short preamble format when the PPDU frame format is the short preamble format, and wherein the multicast PAID is set in a signal A field of a long preamble format when the PPDU frame format is the long preamble format.

3. The method according to claim 1, wherein a length of the multicast PAID is 9 bits, which is obtained by means of calculation after the AP compresses the multicast AID.

4. A multicast procedure protocol data unit (PPDU) frame transmission method, comprising:
   receiving, by a station (STA), a physical layer convergence PPDU frame of a multicast packet sent by an access point (AP), wherein the PPDU frame comprises a first multicast partial association identifier (PAID), wherein the first multicast PAID is calculated as a function of a multicast association identifier (AID) and a basic service set identifier (BSSID), wherein the first multicast PAID is set, by the AP, into the PPDU frame of the multicast packet when the multicast PAID meets a preset condition, wherein the preset condition comprises the multicast PAID not being equal to a first preset value and not being equal to a second preset value, wherein the first preset value is calculated as a function of the BSSID, and wherein the second preset value is calculated as a function of an overlapping BSSID;
   calculating, by the STA, a second multicast PAID according to the multicast AID allocated by the AP;
   comparing whether the first multicast PAID and the second multicast PAID are the same; and
   determining, according to a comparison result, whether the multicast PPDU frame is a multicast PPDU frame corresponding to the STA.

5. The multicast PPDU frame transmission method according to claim 4, wherein the first multicast PAID is set in a signal field of a short preamble format when the multicast PPDU frame format is the short preamble format, and wherein the first multicast PAID is set in a signal A field of a long preamble format when the multicast PPDU frame format is the long preamble format.

6. An access point, comprising:
   a non-transitory computer readable medium having instruction stored thereon; and
   a computer processor coupled to the non-transitory computer readable medium and configured to execute the instructions to:
      obtain, by means of calculation according to a multicast association identifier (AID) of stations (STAs), a multicast partial association identifier (PAID) of the STAs, wherein the multicast PAID is calculated as a function of the multicast AID and a basic service set identifier (BSSID); and
      set the multicast PAID into a physical layer convergence procedure protocol data unit (PPDU) frame of a multicast packet when the multicast PAID meets a preset condition, wherein the preset condition comprises the multicast PAID not being equal to a first preset value and not being equal to a second preset value, wherein the first preset value is calculated as a function of the BSSID, and wherein the second preset value is calculated as a function of an overlapping BSSID.

7. A station (STA), comprising:
   a non-transitory computer readable medium having instruction stored thereon; and
   a computer processor coupled to the non-transitory computer readable medium and configured to execute the instructions to:
      receive a physical layer convergence procedure protocol data unit (PPDU) frame of a multicast packet sent by an access point (AP), wherein the PPDU frame comprises a first multicast partial association identifier (PAID), wherein the first multicast PAID is calculated as a function of a multicast association identifier (AID) and a basic service set identifier (BSSID), wherein the first multicast PAID is set, by the AP, into the PPDU frame of the multicast packet when the multicast PAID meets a preset condition, wherein the preset condition comprises the multicast PAID not being equal to a first preset value and not being equal to a second preset value, wherein the first preset value is calculated as a function of the BSSID, and wherein the second preset value is calculated as a function of an overlapping BSSID;

calculate a second multicast PAID according to the multicast AID allocated by the AP;

compare whether the first multicast PAID and the second multicast PAID are the same; and determine, according to a comparison result, whether the multicast PPDU frame is a multicast PPDU frame corresponding to the STA.

* * * * *